US012582995B2

(12) United States Patent
Quinn

(10) Patent No.: US 12,582,995 B2
(45) Date of Patent: Mar. 24, 2026

(54) MACERATOR

(71) Applicant: Mastek Limited, Cavan (IE)

(72) Inventor: Paul Denis Quinn, Cavan (IE)

(73) Assignee: Mastek Limited, Cavan (IE)

( * ) Notice: Subject to any disclaimer, the term of this patent is extended or adjusted under 35 U.S.C. 154(b) by 63 days.

(21) Appl. No.: 16/644,452

(22) PCT Filed: Sep. 5, 2018

(86) PCT No.: PCT/IE2018/000011
§ 371 (c)(1),
(2) Date: Mar. 4, 2020

(87) PCT Pub. No.: WO2019/049120
PCT Pub. Date: Mar. 14, 2019

(65) Prior Publication Data
US 2021/0060574 A1     Mar. 4, 2021

(30) Foreign Application Priority Data

Sep. 5, 2017     (IE) ................................. S2017/02038

(51) Int. Cl.
| *B02C 18/14* | (2006.01) |
| *A01C 19/02* | (2006.01) |
| *A01C 23/00* | (2006.01) |
| *A01C 23/02* | (2006.01) |
| *B02C 18/18* | (2006.01) |
| *B02C 18/24* | (2006.01) |
(Continued)

(52) U.S. Cl.
CPC .......... B02C 18/144 (2013.01); A01C 23/002 (2013.01); B02C 18/18 (2013.01); B02C 18/182 (2013.01); B02C 18/24 (2013.01);

*B02C 23/36* (2013.01); *A01C 19/02* (2013.01); *A01C 23/021* (2013.01); *B02C 2018/188* (2013.01); *B02C 2201/063* (2013.01); *E03C 1/2665* (2013.01)

(58) Field of Classification Search
CPC .................................................... A01C 23/002
See application file for complete search history.

(56) References Cited

U.S. PATENT DOCUMENTS

| 4,844,366 A | * | 7/1989 | Hatanaka | .............. B02C 18/142 241/293 |
| 5,354,004 A | * | 10/1994 | Chambers, Sr. | .... B02C 18/0092 241/235 |

(Continued)

FOREIGN PATENT DOCUMENTS

| CA | 2201651 | * | 10/1998 | ........... A01C 23/002 |
| CA | 2201651 A1 | * | 10/1998 | |
| CN | 20594984 U | * | 2/2017 | |

(Continued)

*Primary Examiner* — Christopher L Templeton
*Assistant Examiner* — P Derek Pressley
(74) *Attorney, Agent, or Firm* — Bookoff McAndrews, PLLC

(57)     ABSTRACT

A slurry macerator (1) comprising a housing (2), a slurry chamber (3) in the housing (2) for receiving slurry from a slurry inlet (6) on the housing (2), a rotatable cutting plunger (4) in the slurry chamber (3) for macerating slurry, a plurality of slurry outlets (7) on the housing (2) for discharging macerated slurry from the slurry chamber (3) wherein the cutting plunger (4) comprises at least one cutting blade (35) having cutting teeth (9).

31 Claims, 13 Drawing Sheets

(51) Int. Cl.
    B02C 23/36         (2006.01)
    E03C 1/266         (2006.01)

(56)            References Cited

U.S. PATENT DOCUMENTS

2007/0245936 A1 * 10/2007 Sidhwa ................ A01C 23/022
                                             111/118
2012/0032003 A1 * 2/2012 McMahon ........... A01C 23/003
                                             239/505

FOREIGN PATENT DOCUMENTS

| CN | 205948984 U | * | 2/2017 | |
|----|-------------|---|--------|---|
| DE | 102015121039 A1 | | 6/2017 | |
| EP | 1044592 A1 | * | 10/2000 | ........... A01C 23/002 |
| EP | 3175696 A1 | | 6/2017 | |
| FR | 2851482 A1 | * | 8/2004 | ........... A01C 23/002 |
| GB | 2458570 A | * | 9/2009 | ........... A01C 23/003 |

* cited by examiner

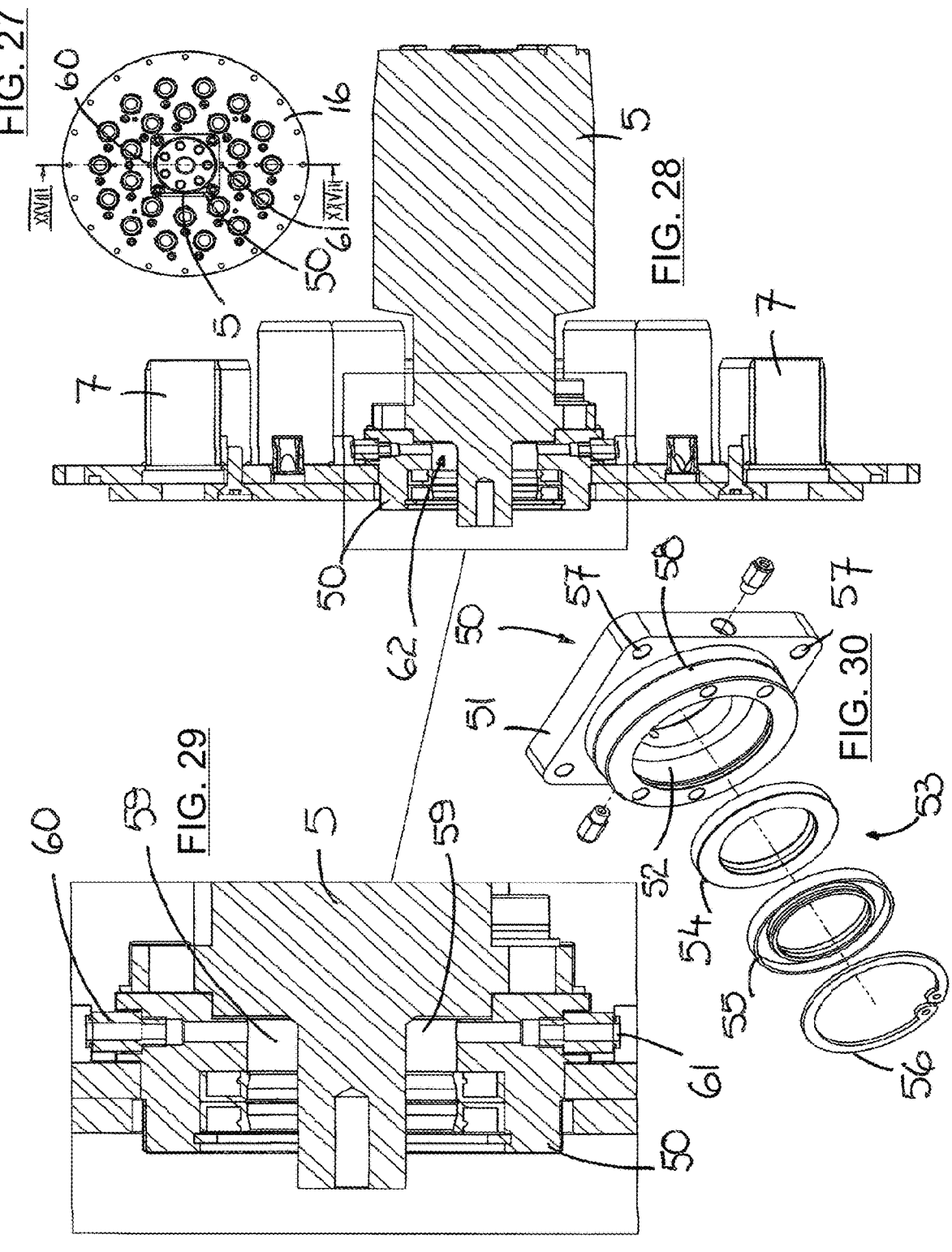

MACERATOR

CROSS-REFERENCE TO RELATED APPLICATION(S)

This patent application is the U.S. National Phase Entry under 35 U.S.C. § 371 of International Application No. PCT/IE2018/000011, filed on Sep. 5, 2018, which claims priority to Irish Patent Application No. IE S2017/0208, filed on Sep. 5, 2017.

This invention relates to a macerator and more particularly to an animal, human or vegetative material slurry macerator and to a slurry applicator comprising the slurry macerator.

BACKGROUND OF THE INVENTION

Slurry spreading is widely used in agriculture as a fertilisation method. Two main methods are used to spread slurry. In a commonly used first method, slurry is spread from a tanker being drawn by a tractor. The slurry is discharged from the rear of the tanker under pressure and distributed through the air by a splash plate. Use of a splash plate to distribute the slurry is inexpensive but suffers from a number of disadvantages. For example, much of the environmentally unfriendly ammonia ($NH_3$) in the slurry is emitted to the air, undesirable strong odours are emitted and up to about a third of the valuable nitrogen component of slurry can be lost.

In order to overcome the problems associated with the splash plate distribution method, dribble bar/band spreaders (hereinafter referred to as band spreaders) were developed in which the slurry is pumped under pressure from a tanker via a pipeline to a series of outlets spaced apart on a boom so that the slurry is placed directly on the ground without splashing resulting in reduced odour, $NH_3$ emissions and nutrient loss. Other types of slurry spreaders include trailing shoe spreaders where a crop parting shoe is located at each outlet of a band spreader to assist in targeting the slurry at the base of crops and shallow injectors or deep injectors where the macerated slurry is injected into soil.

Band spreaders can be used without tankers where the spreaders are mounted directly on a tractor attached via an umbilical pipe or hose up to 2 km long to a stationary slurry containing tank or lagoon.

However, known slurry applicators of the types described above also suffer from a number of disadvantages. For example, in order to ensure uninterrupted flow of slurry through slurry applicators, the slurry applicator is provided with a macerator to chop or macerate solids present in the slurry. The macerators are provided with a motor powered by the hydraulic system of the tractor on which the slurry applicator is mounted. Examples of solids that are present in the slurry include vegetation, fibres, hair and the like. Debris such as timber, plastics and other waste materials can also be present in the slurry. The solids and debris are typically macerated between at least one rotatable cutting blade and a stationary knife plate. However, known macerators can themselves suffer from blockages that need to be removed resulting in operational downtime and delays to the slurry spreading process.

For example, the rotating cutting blades of the macerator are urged against the knife plate by springs. Nevertheless, it is also known for the cutting blades of known macerators to lift away from the knife blade thereby compromising maceration efficiency which can also lead to blockages and operational downtime. However, the biasing power employable in the springs is limited by the power available from a tractor's hydraulic system to provide the torque necessary to effect rotation of the cutting blades i.e. increased torque is required as the biasing power of the springs is increased which reduces cutting efficiency.

In addition, in known macerators air is typically drawn into the macerator via a single large air inlet and follows a path through bores, cavities or recesses in the rotating cutting blade(s) to exit the slurry applicator with the macerated slurry. However, it is known for slurry and in particular solids within the slurry to accumulate in the voids in the rotating blades to block the airflow path causing vacuums to form in the outlets thereby interrupting slurry flow and causing vibrations in the macerator. Moreover, in the event that the single large inlet is obstructed, all slurry flow though the macerator is interrupted.

The above problems are also encountered with macerators for macerating animal, human and vegetative material (e.g. vegetables) slurry.

An object of the invention is to overcome at least some of the problems of the prior art.

SUMMARY OF THE INVENTION

According to the invention there is provided a slurry macerator comprising:

a housing;

a slurry chamber in the housing for receiving slurry from a slurry inlet on the housing;

a rotatable cutting plunger in the slurry chamber for macerating slurry, a plurality of slurry outlets on the housing for discharging macerated slurry from the slurry chamber wherein the cutting plunger comprises at least one cutting blade having cutting teeth.

Preferably, the cutting teeth comprise V-shaped cutting teeth. More preferably, the V-shaped cutting teeth are chamfered.

Preferably, the cutting plunger comprises an impeller. More preferably, the impeller comprises a plurality of cutting blades. Most preferably, the impeller comprises six cutting blades.

Preferably, the cutting blade is formed at a blade head having an outer face free of recesses/cavities to present a smooth outer face to the knife plate. Suitably, the blade head comprises an insert to create the smooth outer face. Preferably, the insert comprises a nylon insert.

Preferably, the blade head comprises a spring loaded blade head.

Preferably, the slurry outlets are provided with air-valves at the housing to facilitate air flow through the slurry outlet. More preferably, each slurry outlet has an associated air valve. Most preferably, the air valves comprise one-way air valves. Advantageously, each air-valve is located at an air hole in the housing.

Optimally, the air holes are positioned above the slurry outlets.

Preferably, each air-valve hole and associated slurry outlet are fluidly communicable via a channel defined in the housing.

In one embodiment of the invention, the housing comprises first and second oppositely disposed sideplates and the air-valve air holes and slurry outlets are defined in the sideplates.

Advantageously, the macerator further comprises a knife plate mounted on each sideplate. Suitably, each knife plate comprises slurry openings to allow egress of slurry from the slurry chamber to the outlet pipe openings.

In a preferred embodiment of the invention, the macerator further comprises a motor mounted on a sideplate. Preferably, the motor is hydraulically powered.

Preferably, the macerator further comprises a motor mounting adapter for mounting a motor on the macerator. More preferably, the motor mounting adapter is externally mountable on the housing.

Suitably, the motor mounting adapter comprises a motor seal arrangement for sealably mounting a motor in the macerator. Preferably, the seal arrangement comprises a pair of lip seals. More preferably, the motor mounting adapter comprises a buffer between the slurry chamber and the motor seal arrangement. Most preferably, the buffer comprises a fluid cavity for receiving a fluid such as grease.

Advantageously, the motor mounting adapter comprises a fluid port for filling the fluid cavity. Preferably, the motor mounting adapter comprises a fluid drain to drain the fluid cavity.

In a preferred embodiment, the motor mounting adapter comprises a motor seal failure alert failsafe mechanism to alert an operator in the event of failure of the motor seal arrangement.

Suitably, the macerator comprises an animal, human or vegetative material slurry macerator. Preferably, the macerator comprises an animal slurry macerator.

The invention also extends to a slurry applicator comprising a slurry macerator as hereinbefore defined. Preferably, the slurry applicator comprises a band spreader.

Preferably, the macerator further comprises a motor mounting adapter for mounting a motor on the macerator. More preferably, the motor mounting adapter is externally mountable on the housing.

Suitably, the motor mounting adapter comprises a motor seal arrangement for sealably mounting a motor in the macerator. Preferably, the seal arrangement comprises a pair of lip seals. More preferably, the motor mounting adapter comprises a buffer between the slurry chamber and the motor seal arrangement. Most preferably, the buffer comprises a fluid cavity for receiving a fluid such as grease.

Advantageously, the motor mounting adapter comprises a fluid port for filling the fluid cavity. Preferably, the motor mounting adapter comprises a fluid drain to drain the fluid cavity.

In a preferred embodiment, the motor mounting adapter comprises a motor seal failure alert failsafe mechanism to alert an operator in the event of failure of the motor seal arrangement.

Suitably, the macerator comprises an animal, human or vegetative material slurry macerator. Preferably, the macerator comprises an animal slurry macerator.

The individual air-valves associated with the slurry outlets in the slurry macerator of the invention obviate the need for an airflow path through the cutting plunger thereby preventing blockages of the macerator during slurry spreading operations. More particularly, due to the absence of the cavities/chambers normally required to direct air through the cutting plunger in the macerators of the prior art, slurry fibres, debris and the like cannot accumulate at the cutting plunger. In addition, as the macerator of the invention is not relying on a single large air inlet for slurry flow, complete interruption of slurry flow through the macerator seldom if ever occurs. Accordingly, slurry can be spread efficiently in an uninterrupted fashion eliminating the downtime frequently required to eliminate blockages.

The V-shaped cutting teeth employed in the rotatable cutting plunger of the invention maximise macerating or cutting efficiency so that increased torque can be obtained from powerful springs at the cutting head without compromising cutting efficiency so that slurry solids and debris such as timber, plastics and the like can be easily sheared to prevent blockages occurring in the macerator.

Further advantages and benefits of the invention are highlighted in the following description.

It should be noted that in the following description, the macerator of the invention is principally described in relation to animal slurry applicators in agriculture, however the macerator of the invention may be employed with other slurry types such vegetable waste and the like.

BRIEF DESCRIPTION OF THE DRAWINGS

The invention will now be described, by way of example only, with reference to the accompanying drawings in which:

FIG. 27 is a side plan view of the drive-side sideplate of the macerator;

FIG. 28 is an enlarged cross-sectional view along the line XXVIII-XXVIII of FIG. 27 showing the motor in the motor mounting adapter;

FIG. 29 is a further enlarged cross-sectional view of the grease port and grease chamber at the motor mounting adapter for preventing contact of slurry with the motor seals;

FIG. 30 is an exploded view of the motor mounting adapter;

DETAILED DESCRIPTION OF THE INVENTION

Figures 1, 2, 3:
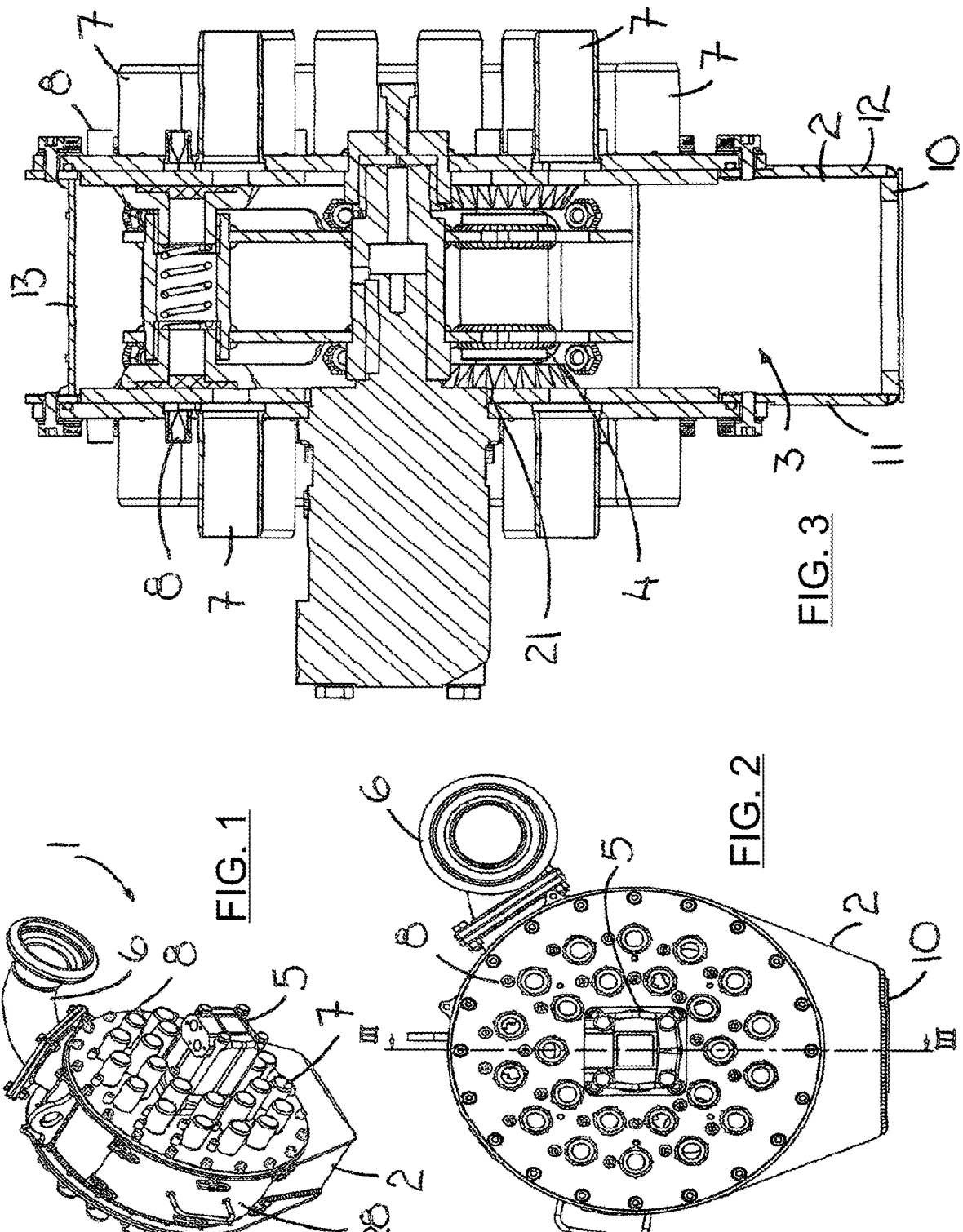
FIG. 1 is a perspective view from above and the motor/ drive side of a first embodiment of a macerator of the invention with the top slurry inlet pipe of the macerator mounted at the slurry inlet of the macerator housing and the removable inspection cover secured to the macerator housing which defines an internal slurry chamber.
FIG. 2 is a plan view of the motor/drive side of the macerator.
FIG. 3 is a cross-sectional view of the macerator along the line III-Ill of FIG. 2 showing the double-sided rotatable cutting plunger in the slurry chamber.
Figures 4, 5, 6:
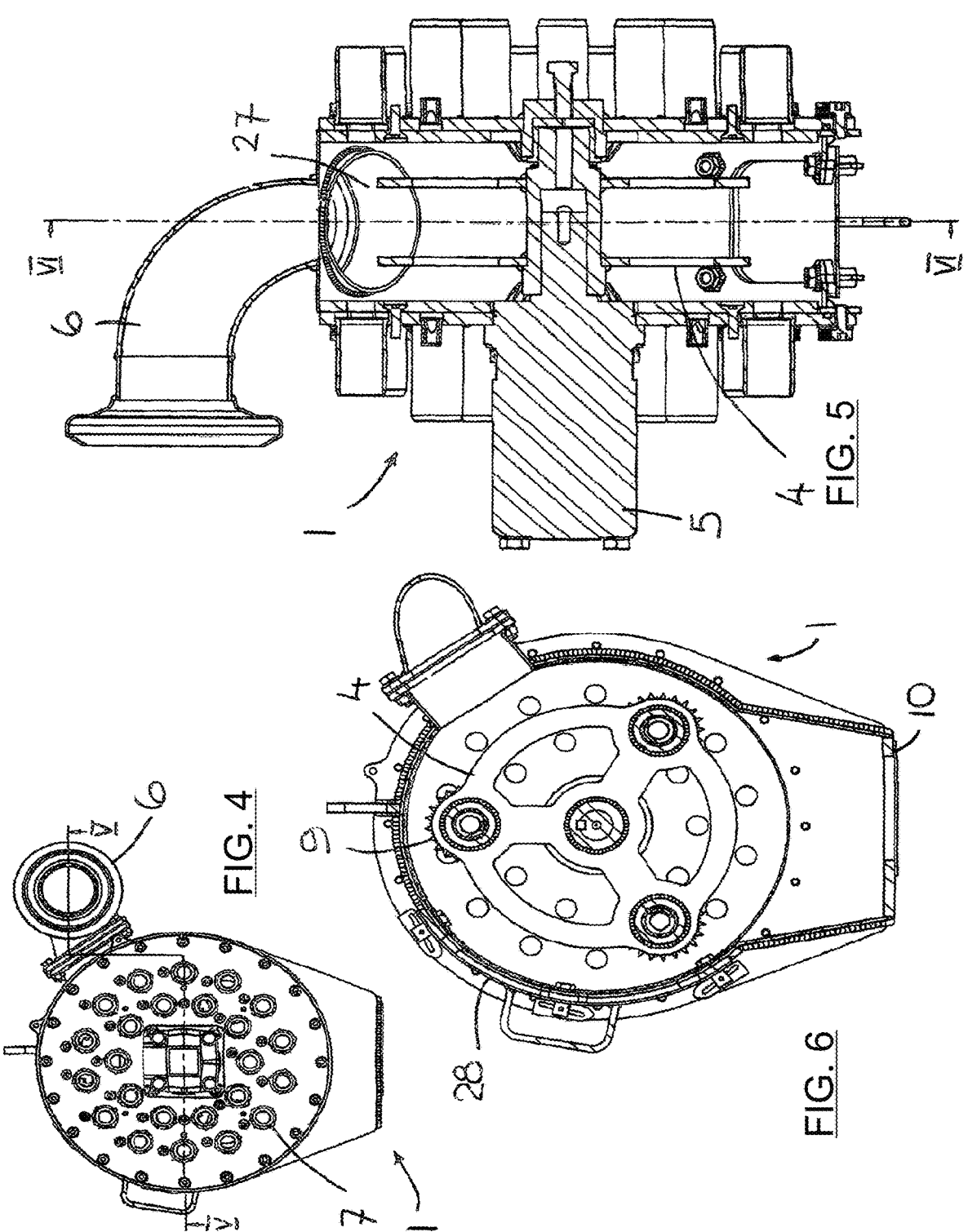
FIG. 4 is a reduced plan view of the motor/drive side of the macerator.
FIG. 5 is an enlarged cross-sectional view along the line V-V of FIG. 4.
FIG. 6 is a cross-sectional view along the line VI-VI of FIG. 5 showing one side of the double-sided rotatable cutting plunger.
Figures 7, 8:
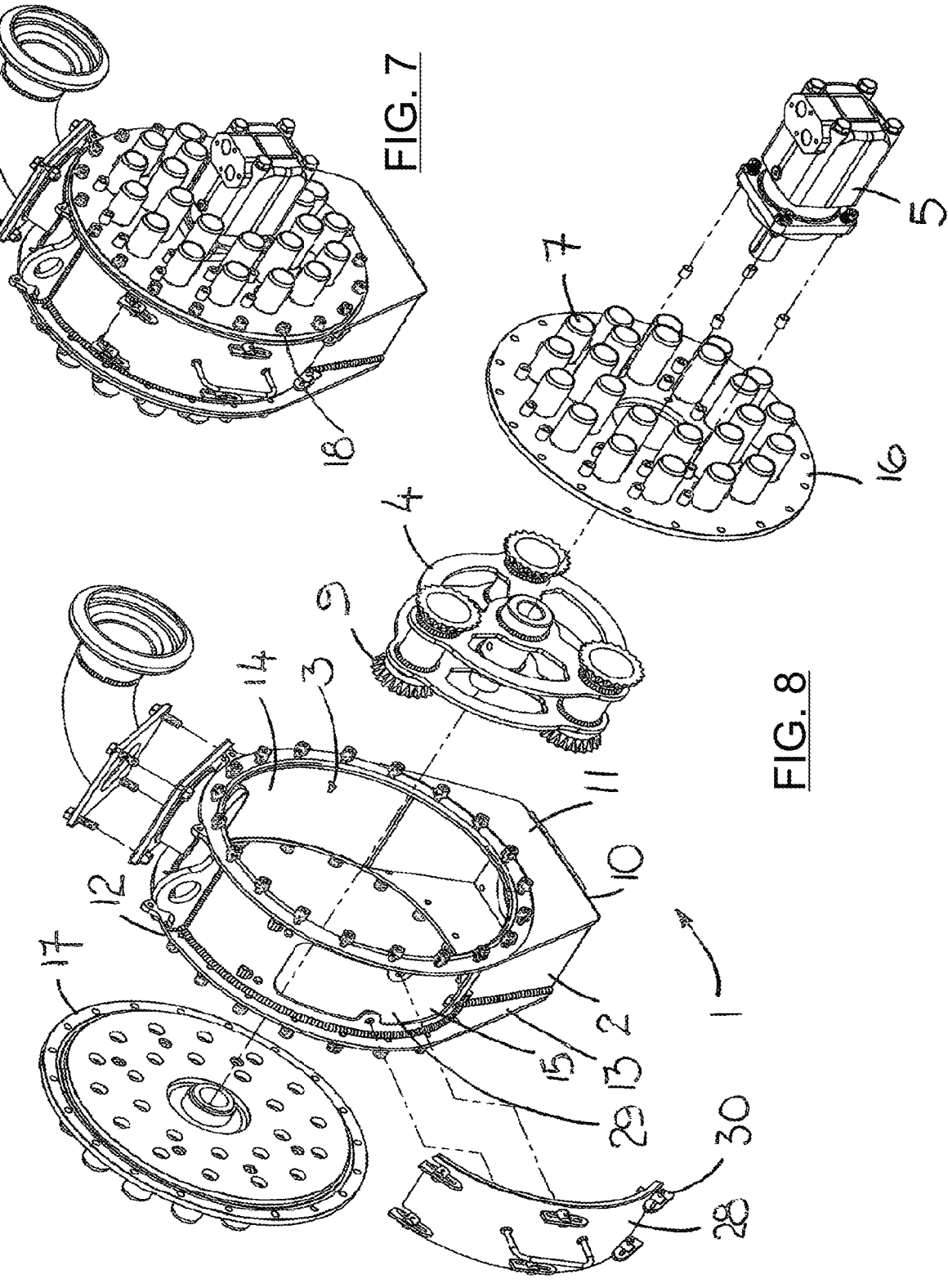
FIG. 7 is an enlarged perspective view from above and the motor/drive side of the macerator of FIG. 1.
FIG. 8 is an enlarged exploded view of the macerator of FIG. 7 showing the rotatable cutting plunger removed from the macerator housing.
Figures 9A, 9B, 10:
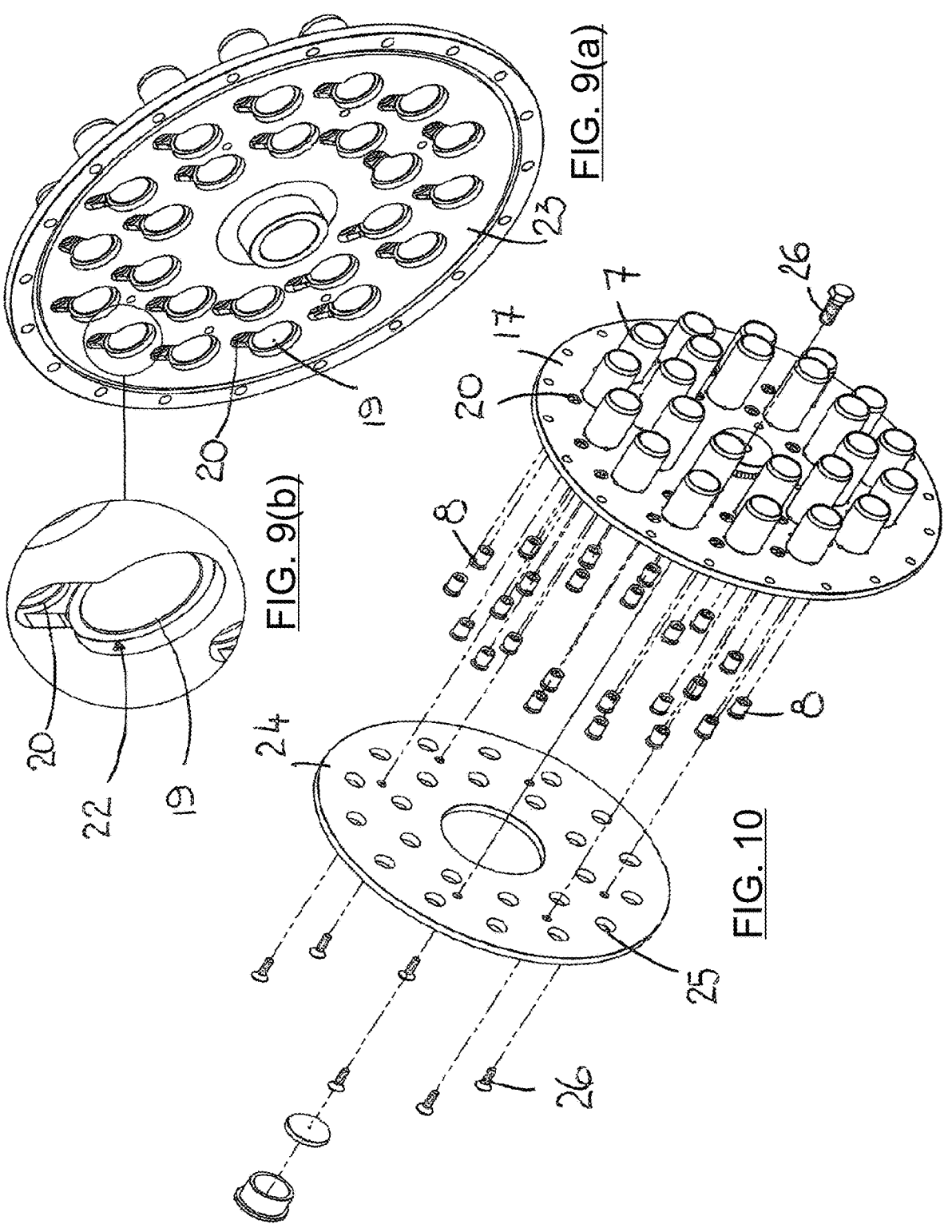
FIG. 9(a) is a perspective view from above and the inside face of a sideplate of the macerator housing with the knife plate removed to reveal an air-valve hole adjacent and above each pipe outlet on the sideplate, each air-valve hole being communicable with its associated pipe outlet via a hollow defined in the sideplate.
FIG. 9(b) is an enlarged perspective view from above and one side of a single pipe outlet and associated air inlet aperture of FIG. 9(a)
FIG. 10 is an exploded view of the sideplate of FIG. 9(a) with the knife plate secured to the sideplate and the one way valves mounted in the air inlet apertures.
Figures 11, 12, 13:
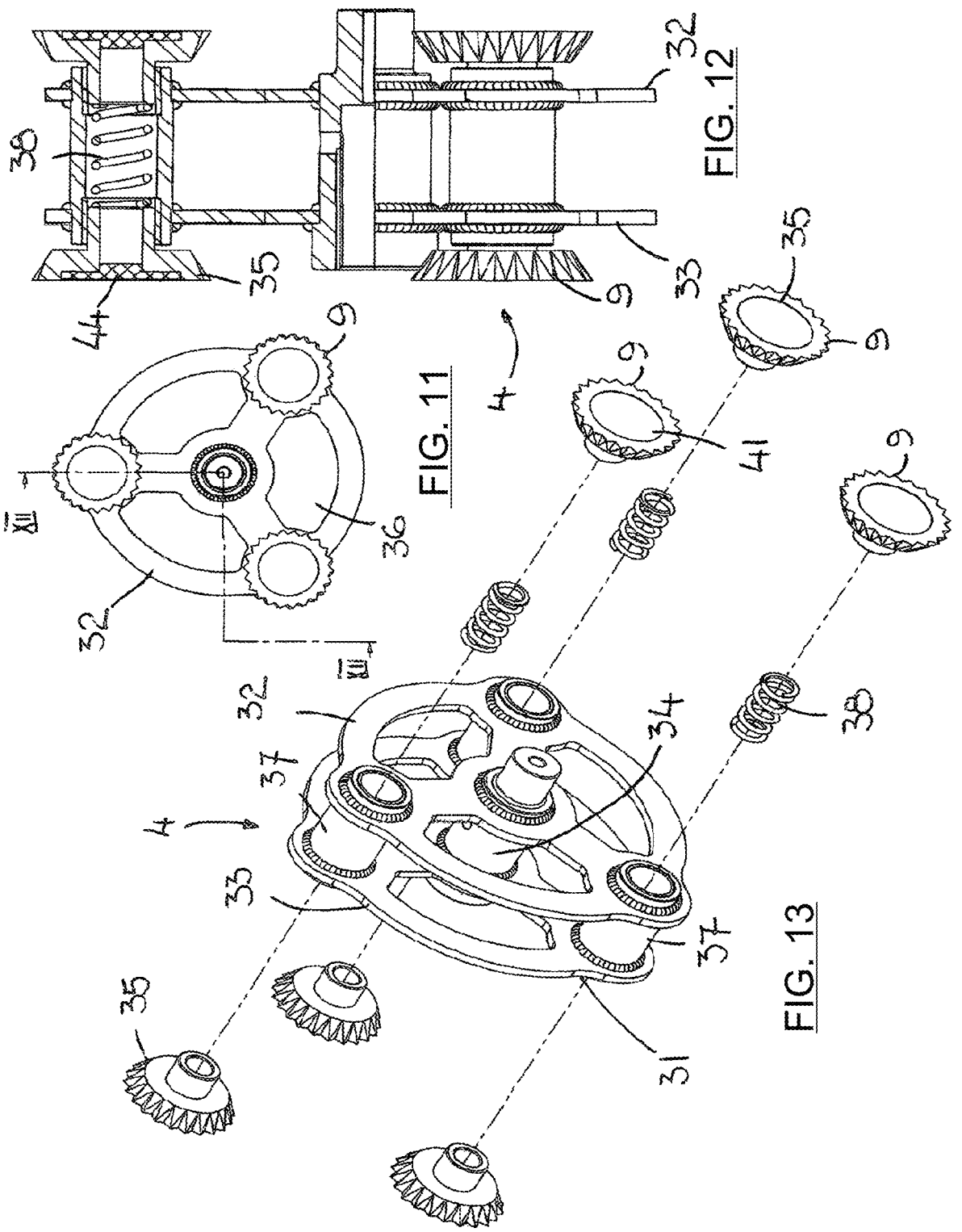
FIG. 11 is a side plan view of the rotatable cutting plunger.
FIG. 12 is a cross-sectional view along the line XII-XII of FIG. 11.
FIG. 13 is an exploded view of the rotatable cutting plunger of FIG. 11.
Figures 14, 15, 16:
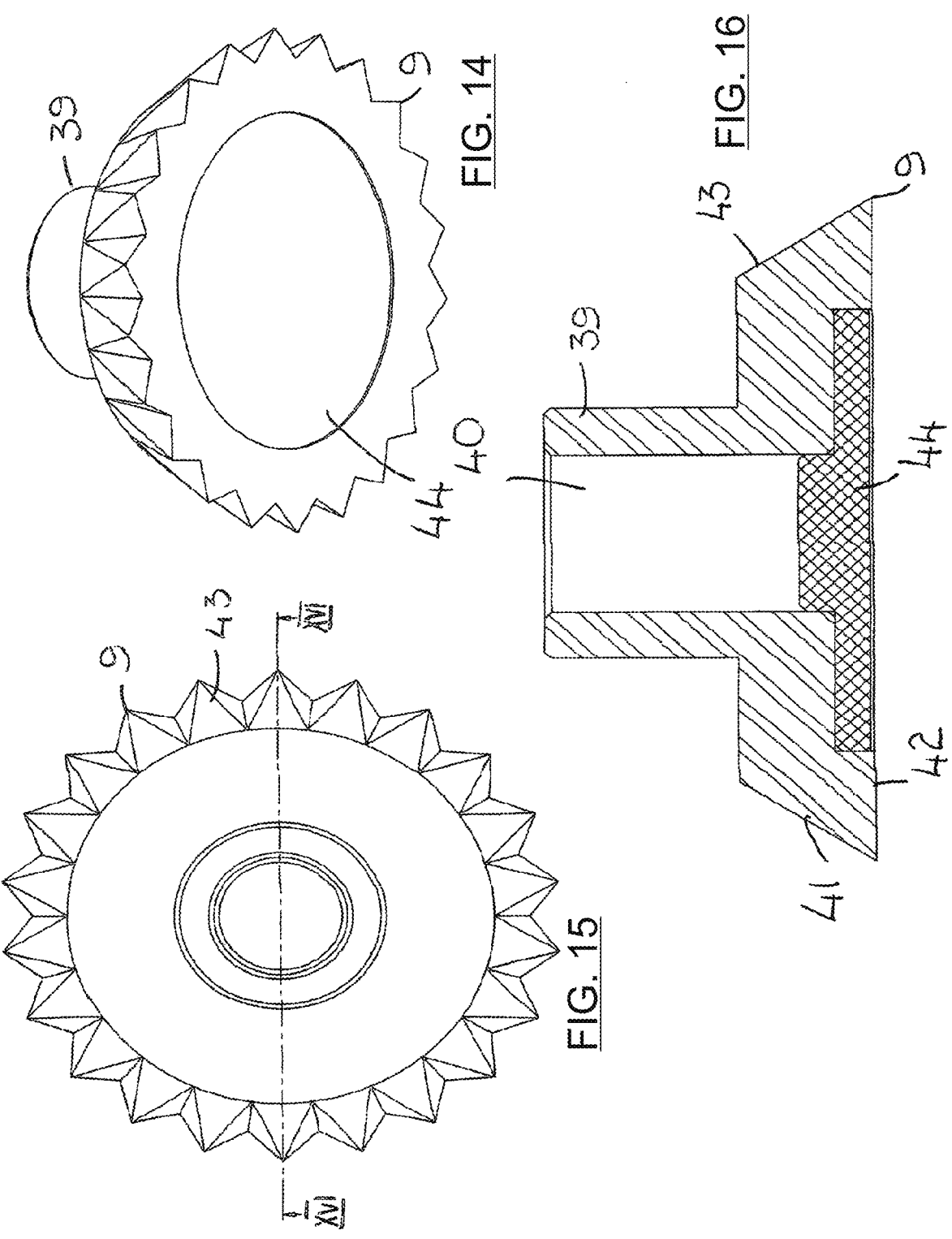
FIG. 14 is an enlarged perspective view from below of the circular cutting blade of the rotatable cutting plunger to clearly show the V-shaped circumferential cutting teeth on the cutting blade and the insert in the cutting face of the cutting blade to define a solid cavity free cutting face in the cutting blade.
FIG. 15 is a plan view below of the cutting blade of FIG. 14.
FIG. 16 is a cross-sectional view along the line XVI-XVI of FIG. 15.
Figures 17, 18:
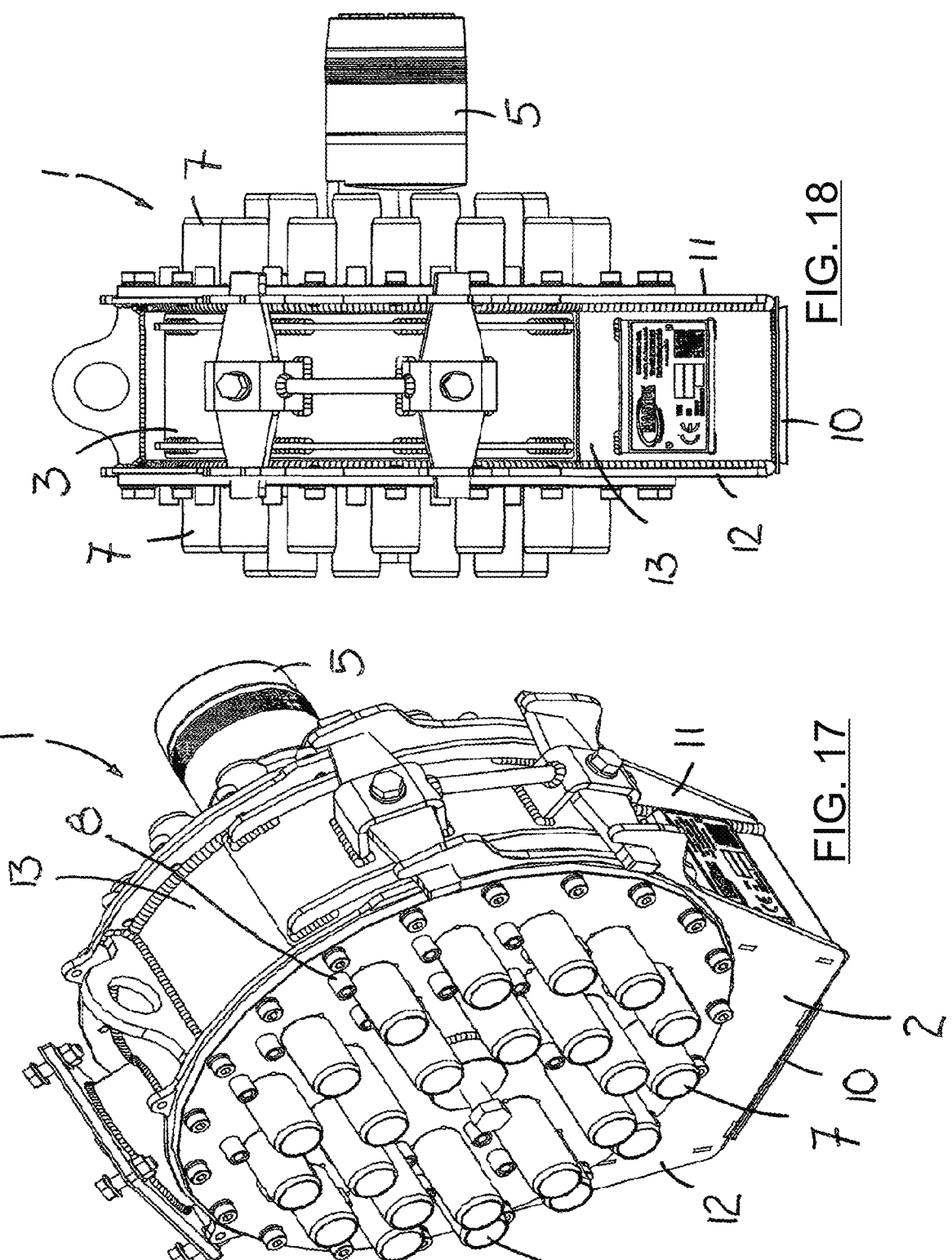
FIG. 17 is a perspective view from above and the non-motor/drive side of a second embodiment of the macerator of the invention in which the macerator is provided with a motor mounting adapter plate and the slurry inlet pipe is a bottom inlet pipe in the housing bottom wall fitted with a conical slurry flow restrictor.
FIG. 18 is a side view of the macerator of FIG. 17.
Figures 19, 20, 21:
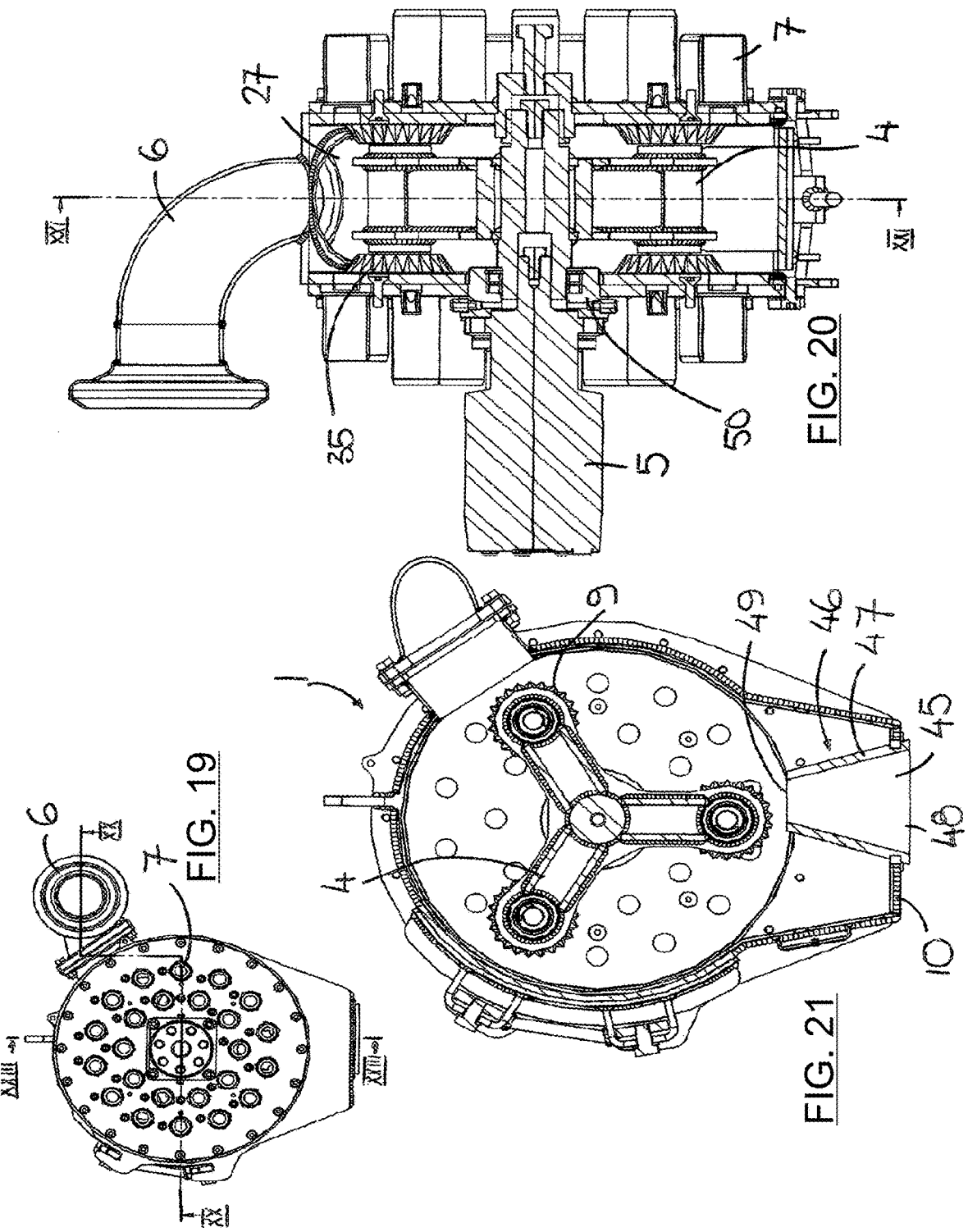
FIG. 19 is front plan view from the motor/drive side of the macerator with the macerator provided with a top slurry inlet pipe as shown in FIGS. 1 to 16.
FIG. 20 is a cross-sectional view along the line XX-XX of FIG. 19.
FIG. 21 is a cross-sectional view along the line XXI-XXI of FIG. 20.
Figures 22, 23:
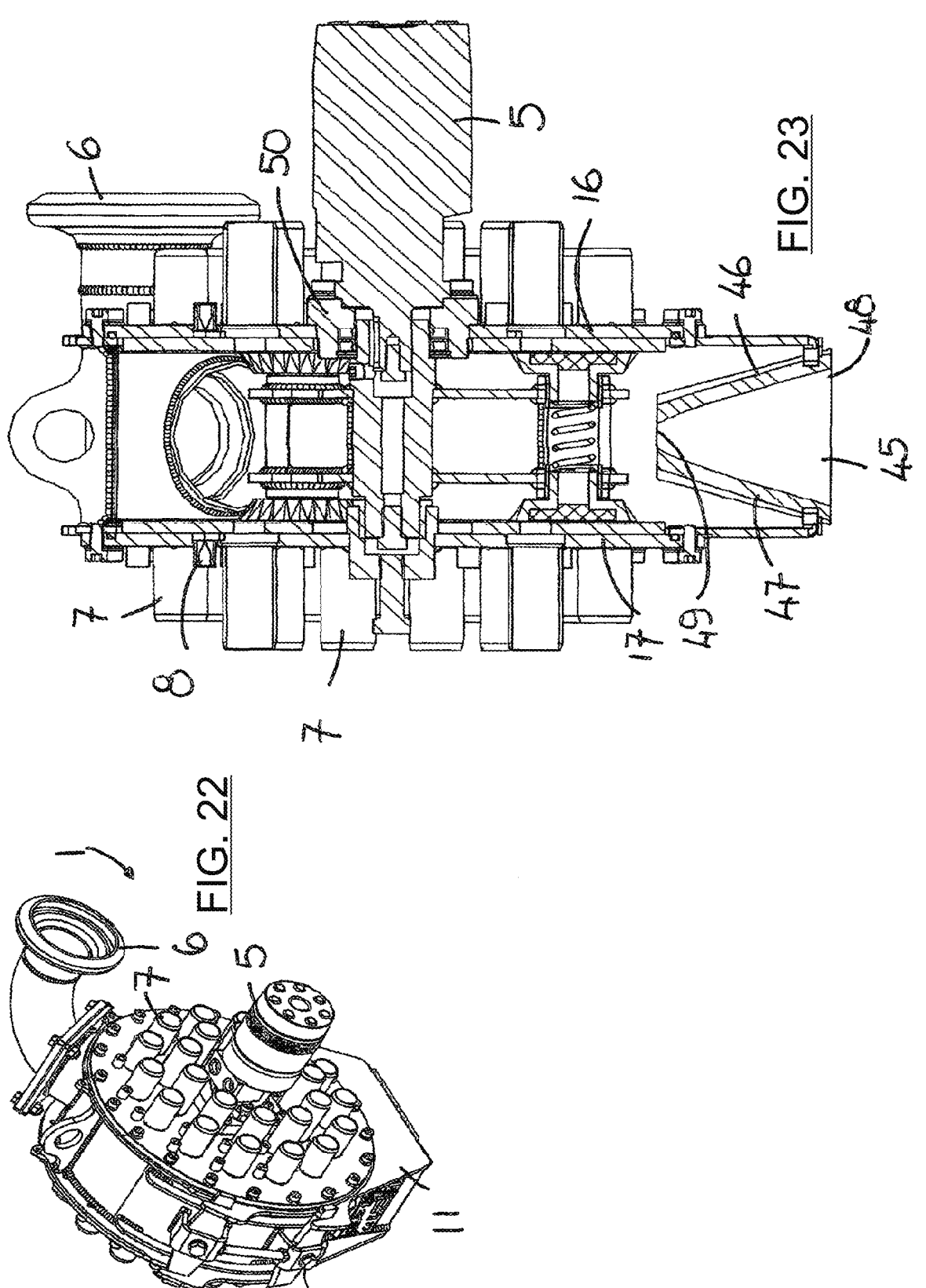
FIG. 22 is a perspective view from above and the motor/drive side of the macerator fitted with an upper slurry inlet pipe.
FIG. 23 is a cross-sectional view along the line XXIII-XXIII of FIG. 19.
Figures 24, 25, 26:
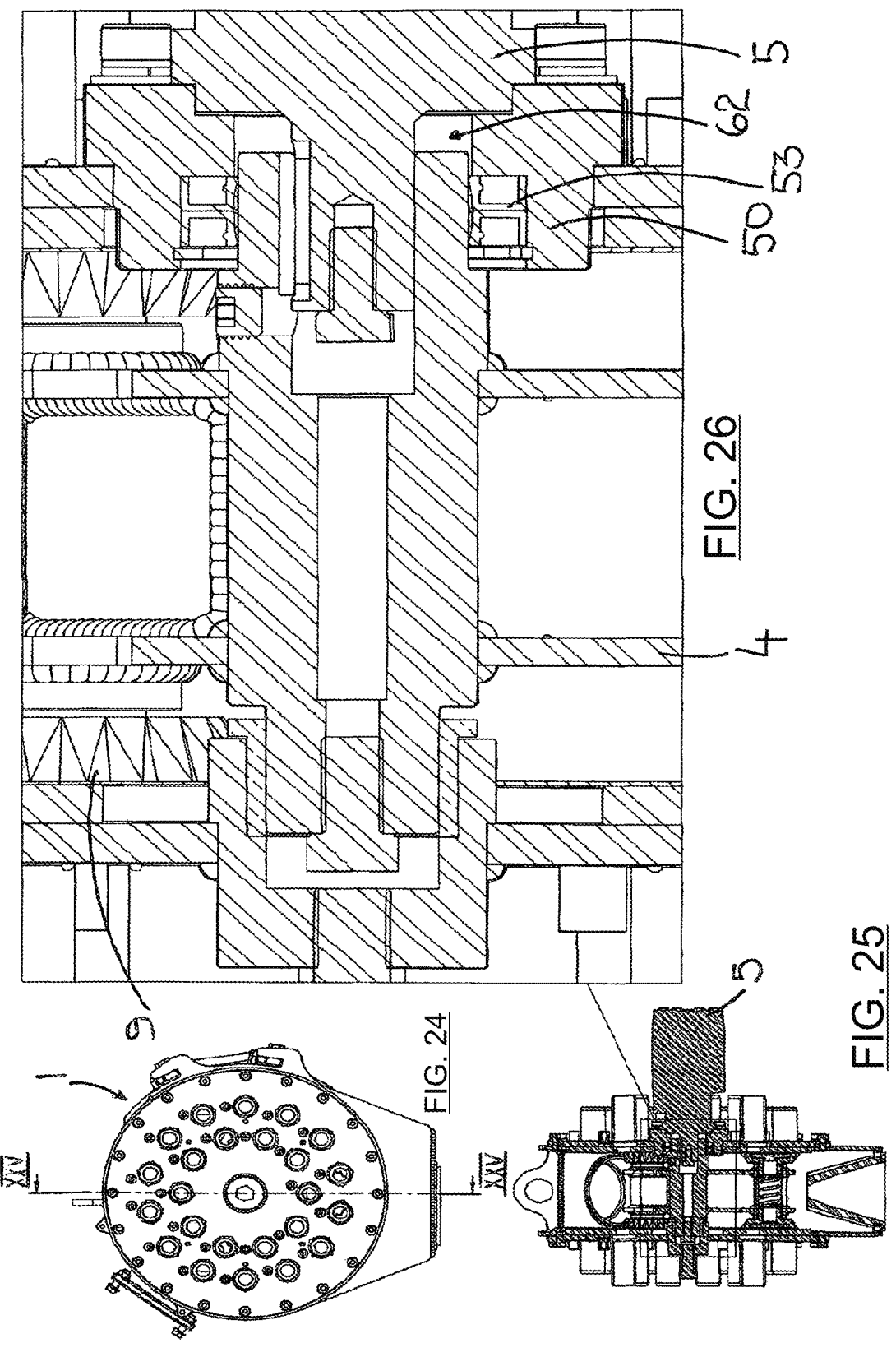
FIG. 24 is a plan view from the non-motor/drive side of the macerator with the upper slurry inlet pipe removed in favour of the bottom slurry inlet pipe.
FIG. 25 is a cross-sectional view along the line XXV-XXV of FIG. 24 to show the motor mounting adapter plate.
FIG. 26 is a an enlarged cross-sectional view of the motor mounting adapter plate of FIG. 25.
Figure 31:
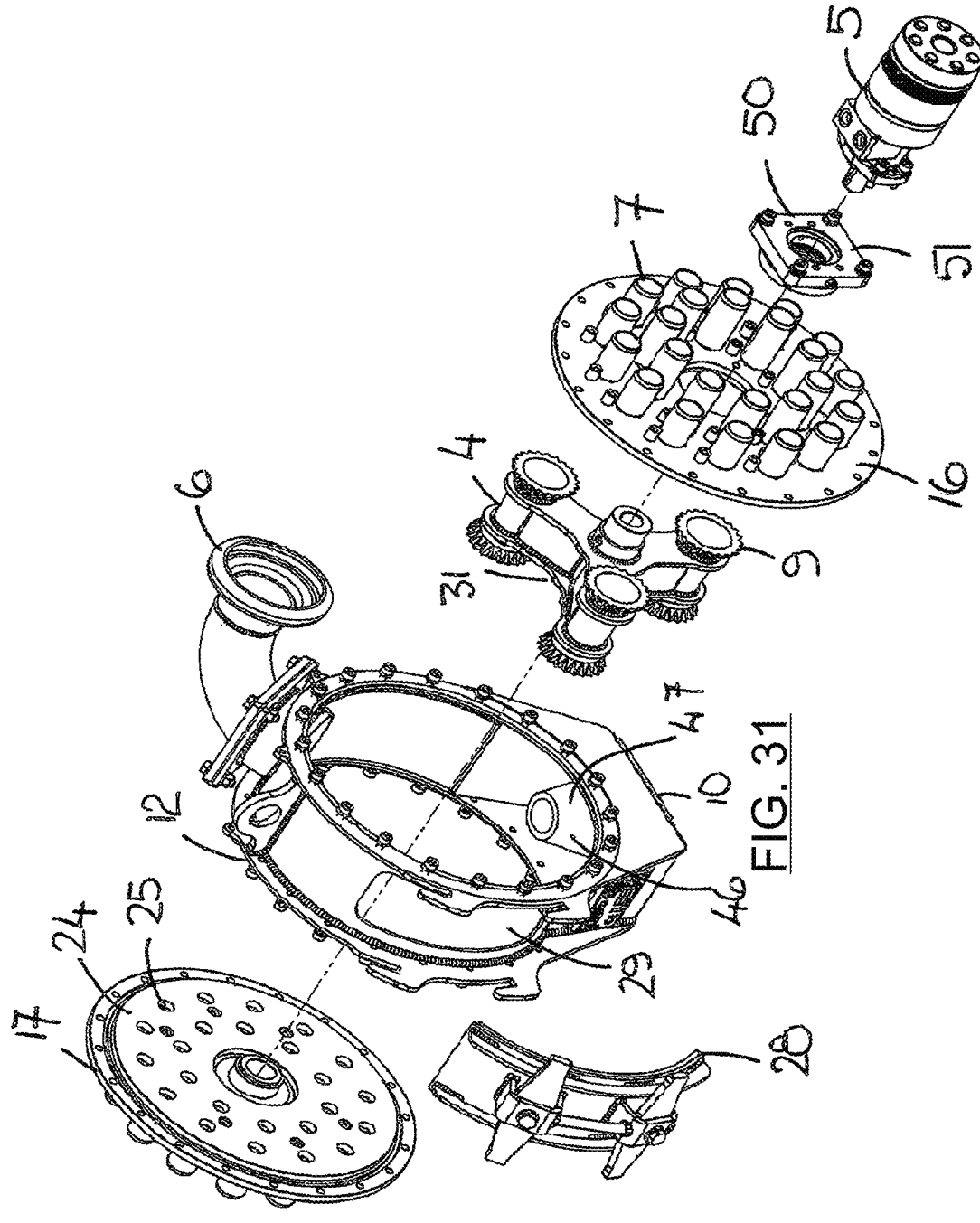
FIG. 31 is an exploded view of the macerator of FIG. 19.

As shown in FIGS. 1 to 16 of the drawings, a first embodiment of a slurry macerator of the invention for macerating slurry for discharge from a slurry applicator such as a band spreader is generally indicated by the reference numeral 1 and is made up of an external housing 2 defining an internal slurry chamber 3 in which a rotatable cutting plunger 4 for cutting and chopping solids in slurry is mounted. The rotatable cutting plunger 4 is driven by a motor 5 mounted on the macerator 1 which can be hydraulically powered by a vehicle such as a tractor used to draw the band spreader. In the present embodiment, the housing 2 is provided with a (top) slurry inlet pipe 6 for receiving slurry under pressure from a slurry tanker on which the band spreader with macerator 1 is mounted or a slurry lagoon or the like to which the band spreader with macerator 1 is connected by an extended slurry hose. As shall be explained more fully below, the housing 2 is provided a plurality of macerated slurry outlet pipes 7 to which individual slurry discharge pipes/hoses (not shown) are connected to discharge the macerated slurry from the macerator 1 with each outlet pipe 7 having an associated one-way air valve 8 disposed above, adjacent and in fluid communication with each outlet pipe 7 to assist in the efficient uninterrupted discharge of the slurry through the outlet pipes 7. The rotatable cutting plunger 4 is provided with V-shaped cutting teeth 9 to enhance the macerating action of the cutting plunger 4 to break up the slurry and solid objects in the slurry to further prevent blockages and enhance slurry throughput through the macerator 1. This too shall be explained more fully below.

The external housing 2 is made up of a housing bottom wall 10, a first drive side sidewall 11, a second oppositely disposed sidewall 12 and a central wall 13 extending between the sidewalls 11,12 to define the internal slurry chamber 3. The first sidewall 11 is provided with a first substantially circular opening 14 and the second sidewall 12 is provided with an identical second substantially circular opening 15 opposite the first opening 14. The first drive side circular opening 14 is fitted with a first drive side sideplate 16 to close the first circular opening 14 while the second circular opening 15 is provided with a second sideplate 17 to close the second circular opening 15. The first and second sideplates 16,17 are secured to the respective sidewalls with fixings 18 such as socket head bolts.

Each sideplate 16,17 is provided with outlet pipe openings 19 through which slurry can pass to the outlet pipes 7. The outlet pipe openings 19 (and hence the outlet pipes 7) are evenly distributed in a circular pattern on the sideplates 16,17 while the outlet pipe openings 19 and associated outlet pipes 7 are disposed directly opposite each other on the sideplates 16,17. The outlet pipe openings 19 and outlet pipes 7 can be numbered as required with twenty four or forty eight being typical.

As indicated above, each outlet pipe opening 19 has an associated one-way air valve 8 disposed above and in close proximity to the outlet pipe openings 19. More particularly, each one-way air valve 8 is mounted in an air-valve hole 20 which extends through the sideplates 16,17 while the drive side sideplate 16 is further provided with a centrally located motor mounting cavity 21 in which the hydraulically powered motor 5 is mounted.

As indicated above, each outlet pipe opening 19 is in fluid communication with its corresponding complementary air-valve hole 20 to facilitate air flow from the one-way air valve 8 through the air-valve hole 20 to the outlet pipe opening 19. Fluid communication between each air-valve hole 20 and its associated outlet pipe opening 19 is provided by a recessed substantially key-hole shaped channel 22 defined on the internal surface 23 of the sideplates 16,17 (see in particular FIG. 9(*b*) in which each outlet pipe opening 19 and its complementary air-valve hole 20 are formed in the sideplates 16,17).

A stationary circular knife plate 24 which in use co-operates with the rotatable cutting plunger to macerate the slurry is attached to the internal surface 23 of each sideplate 16,17. Each knife plate 24 is provided with a series of knife plate slurry openings 25 corresponding in number and layout with the outlet pipe openings 19 on the sideplates 16,17 though which macerated slurry can egress from the slurry chamber 3 to the outlet pipe openings 19 during rotation of the cutting plunger 4. The knife plates 24 are secured to the internal surface 23 of each side plate 16,17 by screw fixings 26.

The external housing 2 is further provided with a slurry inlet hole 27 at the slurry inlet pipe 6 to receive slurry into the slurry chamber 3 from the inlet pipe 6 under pressure from a slurry tanker or slurry lagoon or the like. A removable inspection cover 28 is also mounted on the central wall 13 of the housing 2 to facilitate inspection of and access to the slurry chamber 3 and the rotatable cutting plunger 4 through an inspection opening 29 defined in the central wall 13. The inspection cover 28 is openably secured to the central wall 13 with fastening lugs 30.

The rotatable cutting plunger 4 is rotatably mounted in the slurry chamber 3 and is made up of a rotatable impeller 31 defined by a first circular impeller plate 32 and a second oppositely disposed circular impeller plate 33 spaced apart from and connected to the first impeller plate 32 by a central axle 34 extending between the impeller plates 32,33 about which the impeller 31 can rotate. The central axle 34 is mounted between the motor 5 which drives the impeller 31 at the first drive side sideplate 16 and the second side plate 17. In the present embodiment, each circular impeller plate 32,33 is provided with three circumferentially spaced apart spring-loaded cutting blades 35 with three cut-outs 36 defined in each impeller plate 31,32 between the cutting blades 35 to facilitate slurry agitation and movement of the cutting plunger 4 through the slurry. The cutting blades 35 are mounted in three cutting blade tubes 37 extending between the impeller plates 32,33 so that each cutting blade tube 37 has a cutting blade 35 at each end thereof. Each tube 37 is provided with a powerful spring 38 to urge or bias the cutting blades 35 against the stationary knife plates 24 of the first and second sideplates 16,17.

Each cutting blade 35 is identical in construction and is made up of a neck 39 defining an internal spring aperture 40 for receiving the spring 38 and a disc-like solid blade head 41 extending laterally outwards from the neck 39 at the opposite end to the spring aperture 40. Each blade head 41 has a circular outer face 42, which abuts the adjacent knife plate 24, defined by a circular outer chamfered cutting edge 43. The chamfered cutting edge 43 is shaped and contoured to define the V-shaped cutting teeth 9 so that the V-shaped cutting teeth extend rearwards from the circular outer face 42 from the apex of the V-shape to create a corrugated or cog-like cutting effect.

The blade head 41 and in particular the outer face 42 of the blade head 41 is solid i.e. is free of recesses or cavities so that slurry/debris and the like cannot accumulate at the outer face 42 or between the outer face 43 and the knife plates 24 i.e. the outer face 42 presents a smooth surface to the knife plate 24. In the present embodiment, any cavity that would be otherwise present at the outer face 42 e.g. a cavity created in tooling the blade head 41 to create the spring aperture 40 is closed and sealed by an insert 44 which can be formed from a low friction material such as nylon. The insert 44 also serves to reduce and minimise friction between the cutting blades 35 and the knife plates 24 during operation of the rotatable cutting plunger 4. However, as will be appreciated by those skilled in the art, the blade head 41 could be tooled without a cavity if desired although the low friction insert 44 does improve maceration efficacy.

FIGS. 17 to 34 show a second embodiment of the macerator 1 of the invention broadly similar to the macerator 1 of FIGS. 1 to 16 in that the macerator 1 is generally made up of a housing 2 containing a cutting plunger 4 provided with a plurality of macerated slurry outlet pipes 7 to which individual slurry discharge pipes/hoses (not shown) are connected to discharge the macerated slurry from the macerator 1 with each outlet pipe 7 having an associated one-way air valve 8 disposed above, adjacent and in fluid communication with each outlet pipe 7 to assist in the efficient uninterrupted discharge of the slurry through the outlet pipes 7. The rotatable cutting plunger 4 is also provided with V-shaped cutting teeth 9 to enhance the macerating action of the cutting plunger 4 to break up the slurry and solid objects in the slurry to further prevent blockages and enhance slurry throughput through the macerator 1. Like numerals indicate like parts.

However, in the present embodiment, the housing 2 is also provided with an optional bottom slurry inlet 45 defined in the housing bottom wall 10. The optional bottom slurry inlet 45 is generally employed instead of the top slurry inlet 6 (which can be blanked off in favour of the bottom slurry inlet and vice versa) for smaller macerators to prevent overfilling of the macerator 1 which can result in blockages. In addition, with smaller macerators, it has been found that the macerator 1 can distribute too much slurry too quickly. Accordingly, in the present embodiment, the macerator 1 is also provided with a slurry inlet flow restrictor 46 at the bottom slurry inlet 45 to restrict the flow of slurry into the macerator through the bottom slurry inlet i.e. to restrict the volume of slurry entering the slurry chamber 3. The slurry inlet flow restrictor 46 is in the form of a tapered restrictor 46 such as an internal conical inlet pipe 47 at the bottom inlet 45. The internal conical inlet pipe or cone 47 is formed from a resilient or flexible material such as rubber to further mitigate slurry flow and is oriented at the bottom slurry inlet 45 with its wider mouth 48 mounted at the bottom wall 10 of the housing 2 surrounding the bottom inlet 45 and its narrower mouth 49 disposed inwards towards the slurry chamber 3. The tapered restrictor 46 is highly effective at reducing slurry flow into the macerator 1 to in turn control and reduce slurry flow from the macerator through the outlet pipes 7 i.e. the tapered restrictor 46 creates a flexible resistance or entry barrier at the bottom inlet 45 to slow the entry rate of slurry into the slurry chamber 3 which in turn slows the slurry application rate in the field.

The macerator 1 of the present embodiment is further provided with a motor mounting adapter 50 for mounting the motor 5 to the drive-side sideplate 16. The mounting adapter 50 is mounted externally on the housing 2 of the macerator 1 and in particular on the drive-side sideplate 16. The mounting adapter 50 is made up of a mounting plate 51 defining a socket 52 for receiving the motor 5 and a motor seal arrangement 53 at the socket 53 for sealably mounting the motor 5 in the socket 52. The seal arrangement 53 is made up of a pair of first and second annular lip seals 54,55 and a retaining ring 56 for holding the lip seals 54,55 at the socket 52 about the motor 5. The mounting plate 51 is provided with mounting holes 57 for securing the mounting adapter 50 to the drive-side sideplate 16.

The socket 52 is surrounded by an outer ring 58 defining a buffer 59 between the slurry in the slurry chamber 3 and the motor seal arrangement 53. The buffer 59 is made up of a circular internal fluid cavity 59 defined by the outer ring 58 for receiving a fluid such as grease. An upper fluid or grease port 60 is defined in the motor mounting adapter 50 for filling the fluid cavity with fluid such as grease while a lower fluid/grease drain 61 is also provided to drain the fluid cavity 59. In addition to isolating slurry in the slurry chamber 3 from the sealing arrangement 53, the fluid buffer 59 serves as a motor seal failure alert failsafe mechanism 62 to alert an operator in the event of failure of the motor seal arrangement 54. This shall be explained more fully below.

Figures 32, 33, 34:
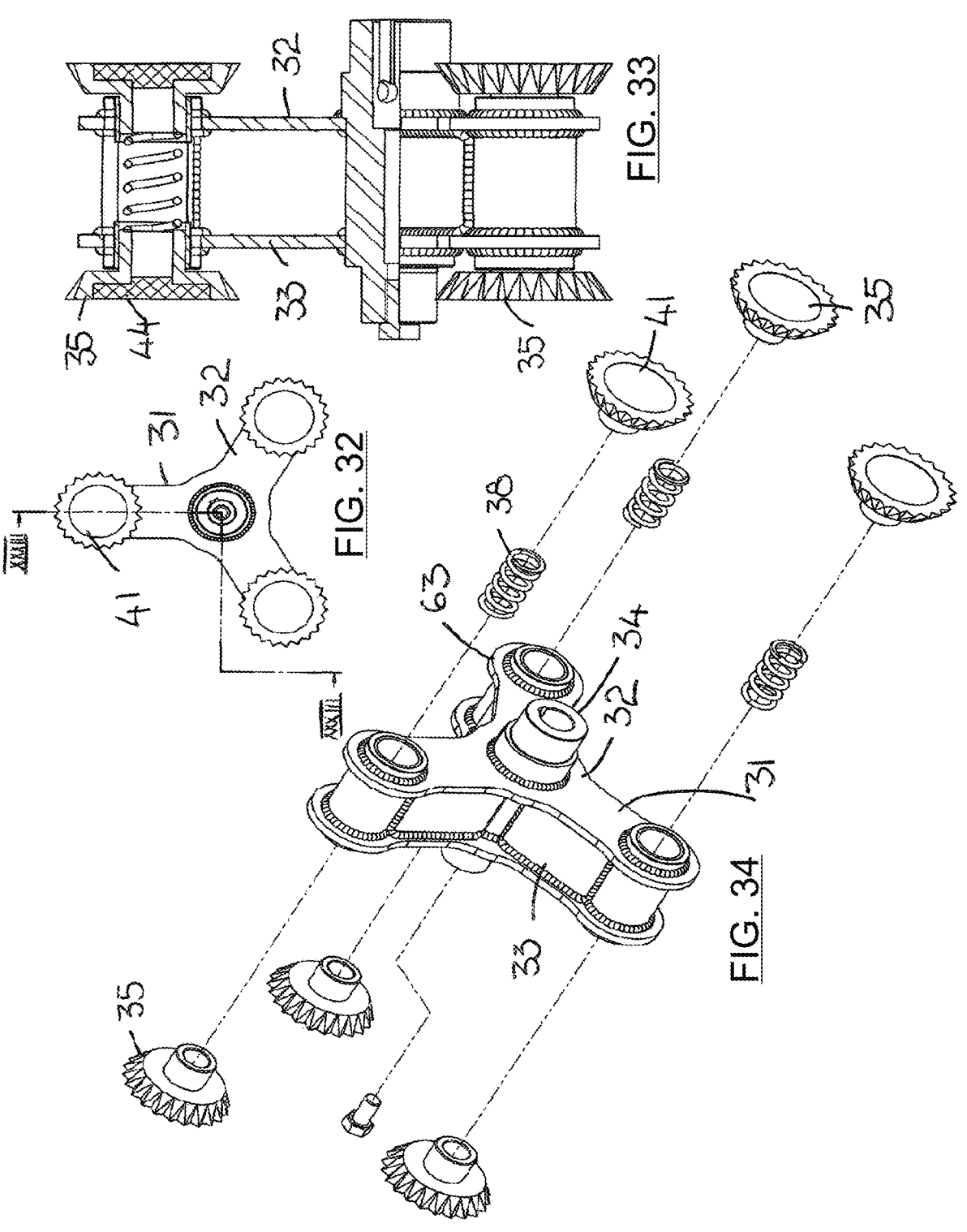
FIG. 32 is a plan view of the rotatable impeller of the macerator.
FIG. 33 is a cross-sectional view along the line XXXIII-XXXIII of FIG. 32.
FIG. 34 is an exploded view of the impeller.

As shown particularly in FIGS. 32 to 34, in the present embodiment, the impeller 31 of the rotatable cutting plunger 4 is rotatably mounted in the slurry chamber 3 as previously described and is made up a first circular impeller plate 32 and a second oppositely circular impeller plate 33 spaced apart from and connected to the first impeller plate 32 by a central axle 34 extending between the impeller plates 32,33 about which the impeller 31 can rotate. The central axle 34 is mounted between the motor 5 which drives the impeller 31 at the first drive side, sideplate 16 and the second side plate 17. However, in the present embodiment, the impeller plates 32,33 are not circular but in the form of three-spoked plates 32,33 having a spring-loaded cutting blade 35 on each spoke. The cutting blades 35 are mounted in three cutting blade tubes 37 extending between the impeller plates 32,33 as previously described.

In use, the macerator 1 of the invention is incorporated into a slurry applicator such as a band spreader which is fitted to a slurry tanker drawn by a tractor. Alternatively, the band spreader can be connected to a slurry lagoon or the like by a pipeline to feed the band spreader. The motor 5 of the macerator 1 is powered by the tractor hydraulic system.

Slurry is pumped into the slurry chamber 3 of the macerator 1 under pressure (typically at approximately 3 bar) via the slurry inlet pipe 6 or the bottom inlet 45/flow restrictor 46 and, as the slurry fills the slurry chamber 3, the motor 5 is activated by an operator via the tractor hydraulic system to rotate the rotatable cutting plunger 4 and in particular the impeller 31 about the central axle 34. The slurry generally fills the slurry chamber 3 completely. Rotation of the impeller 31 causes the six spring-loaded cutting blades 35, and in particular the outer face 42 of the cutting blade heads 41, to travel over the knife plate slurry openings 25 in sequence so that slurry also exits the slurry chamber 3 in sequence through the knife plate slurry openings 25 and hence the side plate outlet pipe openings 19 which are contiguous with the knife plate slurry openings 25 as the cutting plunger 4 rotates. The slurry then travels through the outlet pipes 7 into slurry hoses fitted to the outlet pipes 7.

Rotation of the cutting plunger 4 effects maceration of the slurry within the slurry chamber while a temporary vacuum is created at each outlet pipe 7 as the outer face 42 of the cutting blade head 41 passes over each knife plate opening 25. In the absence of air flow though the outlet pipe such a vacuum can give rise to flow interruption and it is for this reason that prior art macerators have an air flow path through cutting blades—as indicated above such air flow paths can themselves lead to accumulations of slurry and debris giving rise to blockages. However, in the present invention, the one-way air valves 8 in fluid communication with each outlet pipe opening facilitate individual airflow to each individual outlet pipe 7 to facilitate unhindered slurry flow through the outlet pipes 7. Slurry flow is therefore both pressure driven and gravity driven in an uninterrupted manner.

The location of the air-valve holes 20 above each associated outlet pipe opening 19 ensures that slurry residue and the like does not accumulate and block the air-valve holes 20 between uses so that no blockages have to be removed from the macerator following extended downtimes—in prior art macerators it is known for the airways present in the macerators to become blocked during downtimes. Such blockages must be cleared before re-use of the macerators leading to delays in slurry spreading which can be costly—particularly where the permitted time window for slurry spreading is small.

Maceration efficiency and in particular cutting and chopping of solids and debris such as timber and waste plastics is also improved by the V-shaped teeth 9 in combination with powerful springs 38 for urging the cutting blades 35 against the knife plates 24. As will be appreciated by those skilled in the art, as the power of the springs 38 is increased, the cutting and chopping power of the macerator 1 at the interface of the cutting blades 35 and the knife plates 24 is increased. However, increased torque is therefore required to power rotation of the cutting plunger 4 resulting in reduced speed of rotation and potentially compromised cutting efficiency—the amount of power available to effect the rotation being limited by the power available from the tractor's hydraulic system.

However, the Applicant has found that the V-shaped cutting teeth 9 increase cutting efficiency to such an extent that increased strength springs 38 can be used requiring increased torque whilst cutting and macerating efficiency can be simultaneously improved employing the same hydraulic power heretofore used. In particular, the V-shaped cutting teeth 9 serve to entrap or gather (e.g. in clumps) slurry fibres and other debris together between the V-shaped cutting teeth 9 which then macerate the gathered fibres and debris in a shearing action—such a gathering and shearing action not being possible with toothless cutting edges. Moreover, the cutting teeth 9 increase the length of cutting surfaces on the cutting plunger 4 compared with cutting plungers 4 having simple circular cutting surfaces further increasing the efficiency of the macerating action. The V-shaped cutting teeth 9 are particularly efficacious at increasing the cutting surface length.

The macerator 1 of the invention therefore serves to macerate slurry and chop up debris present in slurry in an optimal uninterrupted manner thereby preventing blockages from forming during slurry spreading operations.

In the embodiment described in FIGS. 17 to 34, the motor seal failure alert mechanism 62 alerts an operator in the event of failure of the motor seal arrangement 54. As the fluid cavity 59 is filled with a fluid such as grease and has the pair of lip seals 54,55 positioned between the motor 5 and the slurry chamber 3, mixing of hydraulic oil mixing with slurry in the event of seal failure within the motor 5 itself is prevented. However, in the event of failure, the motor seal failure alert mechanism 62 provides a visual warning or indication to the operator that the motor seals have failed. More particularly, when the motor seals fail, the hydraulic oil driving the motor 5 seeps past the damaged seals to dissolve and mix with the grease within the fluid cavity 59 causing the lubricant-like oil mixture to flow out of the bottom of the motor mounting adapter 50. As the motor mounting adapter 50 is located on the outside of the macerator 1, the oil mixture trickles down the outside of the macerator 1 thus alerting the operator. Without the failsafe mechanism 62, the hydraulic oil would simply mix with slurry inside the macerator 1 giving no indication or warning to the operator until the hydraulic oil within the tractor hydraulic circuit was fully depleted, incurring a sizeable cost in replacing the hydraulic oil and possibly damaging crops with contaminated slurry.

The invention claimed is:

1. A slurry macerator comprising:
   a housing;
   a slurry chamber in the housing for receiving slurry from a slurry inlet on the housing; and
   a rotatable cutting plunger in the slurry chamber for macerating slurry, a plurality of slurry outlets on the housing for discharging macerated slurry from the slurry chamber wherein the cutting plunger comprises at least one circular cutting blade formed at a blade head with a circular outer face, the cutting blade having a circular chamfered cutting edge extending outwardly from a circular inner face:

the circular chamfered cutting edge including continuous, chamfered V-shaped cutting teeth comprising a first laterally chamfered planar cutting face, an oppositely disposed second laterally chamfered planar cutting face, and a third outwardly chamfered planar cutting face between the first chamfered cutting face and the second chamfered cutting face creating a circumferential V-shaped corrugated circular cutting edge with each of the first, second, and third cutting faces originating from the circular inner face.

2. A slurry macerator as claimed in claim 1 wherein the cutting plunger comprises an impeller.

3. A slurry macerator as claimed in claim 2 wherein the impeller comprises a plurality of cutting blades.

4. A slurry macerator as claimed in claim 3 wherein the impeller comprises six cutting blades.

5. A slurry macerator as claimed in claim 1 wherein the outer face is free of recesses/cavities to present a smooth outer face.

6. A slurry macerator as claimed in claim 1 wherein the blade head comprises a low friction insert to create a smooth outer face and reduce and minimise friction between the cutting blade and a knife plate.

7. A slurry macerator as claimed in claim 6 wherein the insert comprises a nylon insert.

8. A slurry macerator as claimed in claim 1 wherein the blade head comprises a neck defining an internal spring aperture for receiving a spring, the blade head extending outwardly from the neck.

9. The slurry macerator of claim 8, wherein the spring comprises a first end and a second end and the first end of the spring presses against the blade head from within the internal spring aperture and the second end of the spring presses against a second blade head from within a second neck of the second blade head, the second blade head being oppositely disposed of the first blade head.

10. A slurry macerator as claimed in claim 1 wherein the slurry outlets are provided with air-valves at the housing to facilitate air flow through the slurry outlet.

11. A slurry macerator as claimed in claim 10 wherein each slurry outlet has an associated one-way air valve.

12. A slurry macerator as claimed in claim 10 wherein each air- valve is located at an air hole in the housing.

13. A slurry macerator as claimed in claim 12 wherein the air holes are positioned above the slurry outlets.

14. A slurry macerator as claimed in claim 12 wherein each air- valve hole and associated slurry outlet are fluidly communicable via a channel defined in the housing.

15. A slurry macerator as claimed in claim 12 wherein the housing comprises first and second oppositely disposed sideplates and the air-valve air holes and slurry outlets are defined in the sideplates.

16. A slurry macerator as claimed in claim 15 wherein the macerator further comprises a knife plate mounted on each sideplate and each knife plate comprises slurry openings to allow egress of slurry from the slurry chamber.

17. A slurry macerator as claimed in claim 15 wherein the macerator further comprises a motor mounted on a sideplate.

18. A slurry macerator as claimed in claim 17 wherein the motor is hydraulically powered.

19. A slurry macerator as claimed in claim 1 wherein the macerator further comprises a motor mounting adapter for mounting a motor on the macerator.

20. A slurry macerator as claimed in claim 19 wherein the motor mounting adapter is externally mountable on the housing.

21. A slurry macerator as claimed in claim 20 wherein the motor mounting adapter comprises a motor seal arrangement for sealably mounting a motor in the macerator.

22. A slurry macerator as claimed in claim 21 wherein the seal arrangement comprises a pair of lip seals.

23. A slurry macerator as claimed in claim 22 wherein the motor mounting adapter comprises a buffer between the slurry chamber and the motor seal arrangement.

24. A slurry macerator as claimed in claim 23 wherein the buffer comprises a fluid cavity for receiving a fluid such as grease.

25. A slurry macerator as claimed in claim 24 wherein the motor mounting adapter comprises a fluid port for filling the fluid cavity.

26. A slurry macerator as claimed in claim 24 wherein the motor mounting adapter comprises a fluid drain to drain the fluid cavity.

27. A slurry macerator as claimed in claim 21 wherein the motor mounting adapter comprises a motor seal failure alert failsafe mechanism to alert an operator in event of failure of the motor seal arrangement.

28. A slurry macerator as claimed in claim 1 wherein the macerator comprises an animal or vegetative material slurry macerator.

29. A slurry macerator as claimed in claim 28 wherein the macerator comprises an animal slurry macerator.

30. A slurry applicator comprising a slurry macerator as claimed in claim 1.

31. A slurry macerator comprising:

a housing comprising first and second oppositely disposed sideplates;

a slurry chamber in the housing for receiving slurry from a slurry inlet on the housing;

a rotatable cutting plunger in the slurry chamber for macerating slurry, a plurality of slurry outlets on the housing for discharging macerated slurry from the slurry chamber wherein the cutting plunger comprises at least one cutting blade formed at a blade head with a circular outer face, the cutting blade having a chamfered cutting edge, extending outwardly from an circular inner face, the chamfered cutting edge including continuous, chamfered V-shaped cutting teeth comprising a first laterally chamfered planar cutting face, an oppositely disposed second laterally chamfered planar cutting face, and a third outwardly chamfered planar cutting face between the first chamfered cutting face and the second chamfered cutting face creating a circumferential V-shaped corrugated cutting edge with each of the first, second, and third cutting faces originating from the circular inner face; and a knife plate mounted on each sideplate, each knife plate comprising slurry openings to allow egress of slurry from the slurry chamber, wherein the blade head comprises a friction reducing insert that contacts the knife plate when the blade head contacts the knife plate to create a smooth outer face and reduce and minimise friction between the cutting blade and a knife plate.

* * * * *